US 9,545,857 B2

(12) United States Patent
Cooley (10) Patent No.: US 9,545,857 B2
(45) Date of Patent: Jan. 17, 2017

(54) RECLINER HOLD-OPEN MECHANISM FOR A VEHICLE SEAT

(71) Applicant: Faurecia Automotive Seating, LLC, Troy, MI (US)

(72) Inventor: Thomas J Cooley, Lapeer, MI (US)

(73) Assignee: Faurecia Automotive Seating, LLC, Troy, MI (US)

( * ) Notice: Subject to any disclaimer, the term of this patent is extended or adjusted under 35 U.S.C. 154(b) by 0 days.

(21) Appl. No.: 13/943,213

(22) Filed: Jul. 16, 2013

(65) Prior Publication Data

US 2014/0015297 A1 Jan. 16, 2014

Related U.S. Application Data

(60) Provisional application No. 61/672,149, filed on Jul. 16, 2012.

(51) Int. Cl.
*B60N 2/12* (2006.01)
*B60N 2/20* (2006.01)
*B60N 2/30* (2006.01)
*B60N 2/36* (2006.01)
*B60N 2/44* (2006.01)

(52) U.S. Cl.
CPC . *B60N 2/20* (2013.01); *B60N 2/12* (2013.01); *B60N 2/3009* (2013.01); *B60N 2/3013* (2013.01); *B60N 2/3065* (2013.01); *B60N 2/366* (2013.01); *B60N 2002/4455* (2013.01)

(58) Field of Classification Search
CPC ............... B60N 2/36; B60N 2/12; B60N 2/20; B60N 2002/126; B60N 2/235; B60N 2/3002; B60N 2/3009; B60N 2/3011; B60N 2/206; B60N 2/366
See application file for complete search history.

(56) References Cited

U.S. PATENT DOCUMENTS

| | | | | |
|---|---|---|---|---|
| 3,931,995 A | * | 1/1976 | Arai | B60N 2/12 297/341 |
| 5,597,206 A | * | 1/1997 | Ainsworth | B60N 2/0705 297/317 |
| 5,899,532 A | * | 5/1999 | Paisley | B60N 2/123 297/341 |
| 5,927,809 A | * | 7/1999 | Tame | B60N 2/123 297/341 |
| 6,139,104 A | * | 10/2000 | Brewer | B60N 2/20 297/341 |

(Continued)

*Primary Examiner* — Ryan Kwiecinski
(74) *Attorney, Agent, or Firm* — Reising Ethington P.C.

(57) ABSTRACT

A vehicle seat includes a seat back is coupled to a seat base for movement between an upright position and a folded-forward position when a vehicle seat recliner is in an open configuration. The vehicle seat includes a recliner hold-open mechanism that locks the recliner in the open configuration even after a user releases a handle or otherwise disengages an actuator of the recliner. The seat back is thus free to move between the upright and folded-forward positions without the user being required to hold the actuator in any particular position during the movement. The hold-open mechanism may be configured to cooperate with a seat-base motion controller to free the vehicle seat for movement along a foundation frame while the seat back is between the upright and folded-forward positions.

16 Claims, 11 Drawing Sheets

(56) References Cited

U.S. PATENT DOCUMENTS

| | | | | |
|---|---|---|---|---|
| 6,152,533 A * | 11/2000 | Smuk | B60N 2/12 | 297/341 |
| 6,250,704 B1 * | 6/2001 | Garrido | B60N 2/06 | 296/65.03 |
| 6,336,679 B1 * | 1/2002 | Smuk | B60N 2/0705 | 297/341 |
| 2004/0021355 A1 * | 2/2004 | Ohba | B60N 2/06 | 297/341 |
| 2004/0075323 A1 * | 4/2004 | Blair | B60N 2/06 | 297/331 |
| 2005/0046261 A1 * | 3/2005 | Grable | B60N 2/2354 | 297/378.1 |
| 2009/0056393 A1 * | 3/2009 | Otsuka | B60N 2/01583 | 70/205 |
| 2009/0295185 A1 * | 12/2009 | Abe | B60N 2/3065 | 296/65.09 |
| 2009/0315378 A1 * | 12/2009 | Kumazaki | B60N 2/12 | 297/341 |
| 2010/0236024 A1 * | 9/2010 | Douceau | B60N 2/20 | 16/349 |
| 2010/0244524 A1 * | 9/2010 | Kumazaki | B60N 2/12 | 297/341 |
| 2012/0056459 A1 * | 3/2012 | Harden | B60N 2/06 | 297/316 |
| 2013/0147249 A1 * | 6/2013 | Champ | B60N 2/3011 | 297/337 |
| 2014/0306479 A1 * | 10/2014 | Abe | B60N 2/3013 | 296/65.09 |

\* cited by examiner

RECLINER HOLD-OPEN MECHANISM FOR A VEHICLE SEAT

This application claims the benefit of U.S. Provisional Patent Application No. 61/672,149 filed Jul. 16, 2012, the entire contents of which are hereby incorporated by reference.

TECHNICAL FIELD

The present disclosure relates to vehicle seats, and, more particularly to vehicle seats with reclining seat backs.

BACKGROUND

Vehicle seats may be equipped with recliners that allow adjustment of the angle of the seat back with respect to the seat bottom. Some recliners include multiple locking zones, with free rotation of the seat back limited to positions within a single locking zone. Where it may be desired to fold the seat back so that it is flat relative to the vehicle floor, such recliners require a user to hold the recliner in a particular position to allow rotation of the seat back to the end of one of the locking zones, where the free rotation is halted. Then the user must operate the recliner again to move the recliner past the end of the locking zone and into the next locking zone for any additional free movement necessary to place the seat back in the flat position.

SUMMARY

In accordance with one or more embodiments, a vehicle seat includes a seat base, a seat back coupled to the seat base for movement between an upright position and a folded-forward position about a seat-back pivot axis, a recliner, and a recliner hold-open mechanism. The recliner has an actuator configured to change the recliner from a closed configuration to an open configuration when the actuator is engaged. Seat back movement about the seat-back pivot axis is prevented in the closed configuration and allowed in the open configuration. The recliner hold-open mechanism is configured to lock the recliner in the open configuration when the actuator is disengaged while the recliner is in the open configuration.

In one or more of the embodiments, the recliner hold-open mechanism includes a cam plate coupled to the seat back for movement therewith about the seat-back pivot axis and a cam follower coupled to the seat base for movement about a different pivot axis.

In one or more of the embodiments, the recliner hold-open mechanism includes a hold-open link coupled to the cam follower and to the recliner.

In one or more of the embodiments, the vehicle seat includes a track lock coupled to the seat base and configured to move between an engaged position and a disengaged position. Seat base movement along a foundation frame is prevented in the engaged position and allowed in the disengaged position.

In one or more of the embodiments, the recliner hold-open mechanism includes a cam follower coupled to the seat base for movement about a different pivot axis. The cam follower is configured to move the track lock to the disengaged position during movement of the seat back between the upright position and the folded-forward position.

In one or more of the embodiments, the vehicle seat includes a forward slide blocker configured to move between a lowered position and a raised position. Seat movement along the foundation frame beyond a set point is prevented in the lowered position and allowed in the raised position.

In one or more of the embodiments, the track lock and the forward slide blocker are configured to be in respective disengaged and raised positions during seat back movement between the upright position and the folded-forward position.

In one or more of the embodiments, the cam follower includes a protrusion that engages the forward slide blocker during seat back movement between the upright position and the folded-forward position so that the track lock and the forward slide blocker are in respective disengaged and raised positions during seat back movement between the upright position and the folded-forward position.

In accordance with one or more embodiments, a method of moving a seat back of a vehicle seat between an upright position and a folded-forward position includes the steps of: (a) engaging an actuator while the seat back is in one of the upright position or the folded-forward position; (b) moving the seat back about a seat-back pivot axis to a position between the upright position and the folded-forward position; (c) disengaging the actuator while the seat back is the position of step (b); and (d) moving the seat back about the seat-back pivot axis to the other one of the upright or folded-forward positions.

In one or more of the embodiments, the method includes the step of moving the vehicle seat along a foundation frame after engaging the actuator.

In one or more of the embodiments, the method includes the step of changing a track lock from an engaged position to a disengaged position to allow the vehicle seat to move along the foundation frame.

In one or more of the embodiments, step (b) includes the step of changing the track lock from the engaged position to the disengaged position.

In one or more of the embodiments, the method includes the step of changing a forward slide blocker from a lowered position to a raised position to allow the vehicle seat to move past a set point during the step of moving the vehicle seat along the foundation frame.

DESCRIPTION OF THE DRAWINGS

One or more embodiments will hereinafter be described in conjunction with the appended drawings, wherein like designations denote like elements, and wherein.

DETAILED DESCRIPTION

The vehicle seat described below includes a seat back that is moveable between an upright position and a folded-forward position. The vehicle seat can be constructed so that a user can actuate a seat recliner to allow this type of movement in a manner where the user is not required to hold a lever or handle in any particular position to facilitate the movement. The vehicle seat includes a mechanism that locks the seat recliner open when actuated, and then closes the seat recliner once the seat back reaches the desired folded-forward or upright position.

Figures 1, 2:
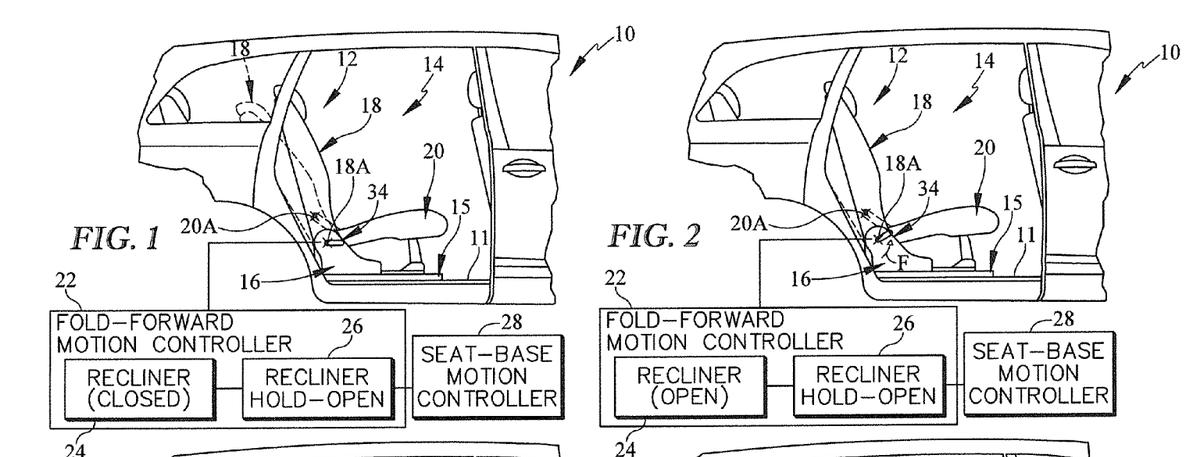
FIG. 1 is a side view of an illustrative vehicle seat mounted to the floor of a vehicle with a seat back in an upright position and a recliner in a closed configuration.
FIG. 2 is a side view of the vehicle seat of FIG. 1 with the seat back in the upright position and the recliner in an open configuration.
Figure 3:
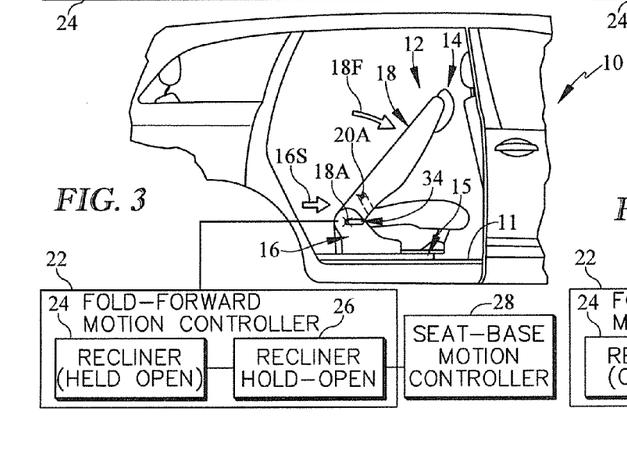
FIG. 3 is a side view of the vehicle seat of FIG. 1 with the seat back between the upright position and a folded-forward position.
Figure 4:
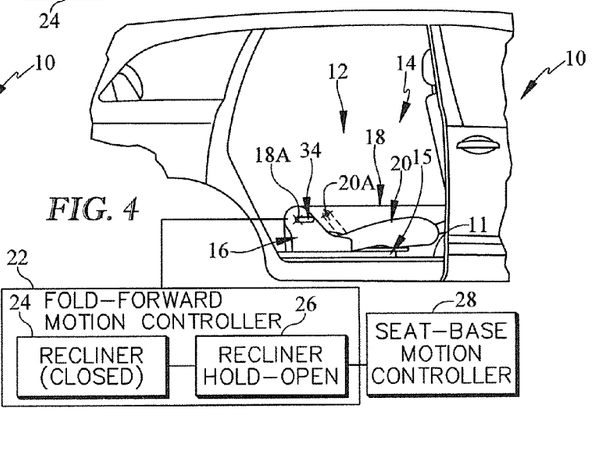
FIG. 4 is a side view of the vehicle seat of FIG. 1 with the seat back in the folded-forward position.

With reference to FIGS. 1-4, an illustrative vehicle 10 includes a passenger support 12 with a moveable vehicle seat 14 mounted on a foundation frame 15. The illustrated embodiment of the vehicle seat 14 includes a seat base 16, a seat back 18, a seat bottom 20, and a fold-forward motion controller 22. The seat base 16 is coupled to a floor 11 of the vehicle 10. The seat back 18 is coupled to the seat base 16 for movement about a seat-back pivot axis 18A among reclined, upright, and folded-forward positions. FIG. 1 shows the seat back 18 in an illustrative upright position, extending up and away from the floor 11, and in an illustrative reclined position, shown in dashed lines. FIG. 4 shows the seat back 18 in an illustrative folded-forward position, extending generally parallel to the floor 11 of the vehicle 10. The seat back 18 may be biased toward the folded-forward position by a spring or other means (not shown). The seat bottom 20 is coupled to and extends away from the seat back 18 when the seat back is in the upright position. The fold-forward motion controller 22 is illustrated schematically in FIGS. 1-4 and is configured to control motion of the seat back 18 between the upright position and the folded-forward position.

The illustrated passenger support 12 also includes a recliner 24, a recliner hold-open mechanism 26, and a seat-base motion controller 28, each shown schematically in FIGS. 1-4. The recliner 24 and the recliner hold-open mechanism 26 are included here as part of the fold-forward motion controller 22. The recliner 24 is coupled to the seat back 18 and can be actuated or otherwise changed between a closed configuration and an open configuration. When the recliner 24 is in the closed configuration, seat back 18 movement about the pivot axis 18A is prevented, and the recliner may be referred to as closed. When the recliner 24 is in the open configuration, seat back 18 movement about the pivot axis 18A is allowed, and the recliner may be referred to as open. When changed from the closed configuration of FIG. 1 to the open configuration of FIG. 2, the seat back 18 is allowed to move away from the upright position toward the folded-forward position as suggested by arrow 18F in FIG. 3. In this example, the recliner 24 is changed from the closed configuration to the open configuration when a force F is applied to a handle 34 of the recliner 24, as shown in FIG. 2. In other embodiments, the recliner 24 is actuated to change configurations without a handle, such as by push button, touch-operation, or by any automated actuator that does not require physical user interaction.

The recliner hold-open mechanism 26 is coupled to the seat base 16, the seat back 18, and the recliner 24. The recliner hold-open mechanism 26 is configured to hold the recliner 24 open during movement of the seat back 18 between the upright position and the folded-forward position so that the movement of the seat back 18 from the upright position to the fold-forward position is not interrupted, even when the force F is removed from the handle 34, as shown in FIG. 3. Thus, with the seat back 18 in the upright position, a user may momentarily apply a force F to the handle 34 to open the recliner 24 and then release the handle, and the seat back 18 remains free for movement toward the folded-forward position by operation of the recliner hold-open mechanism 26, as suggested in FIGS. 1-4, even after the handle is released.

The seat-base motion controller 28 provides means for freeing the vehicle seat 14 to move along the foundation frame 15 during movement of the seat back 18 between the upright position and the folded-forward position while no force is applied to the handle 34. Thus, the user can slide the vehicle seat 14 along the foundation frame 15 while moving the seat back 18 from the upright position to the folded-forward position so that the vehicle seat is positioned desirably along the floor of the vehicle when the seat back 18 reaches the folded-forward position.

Figure 5:
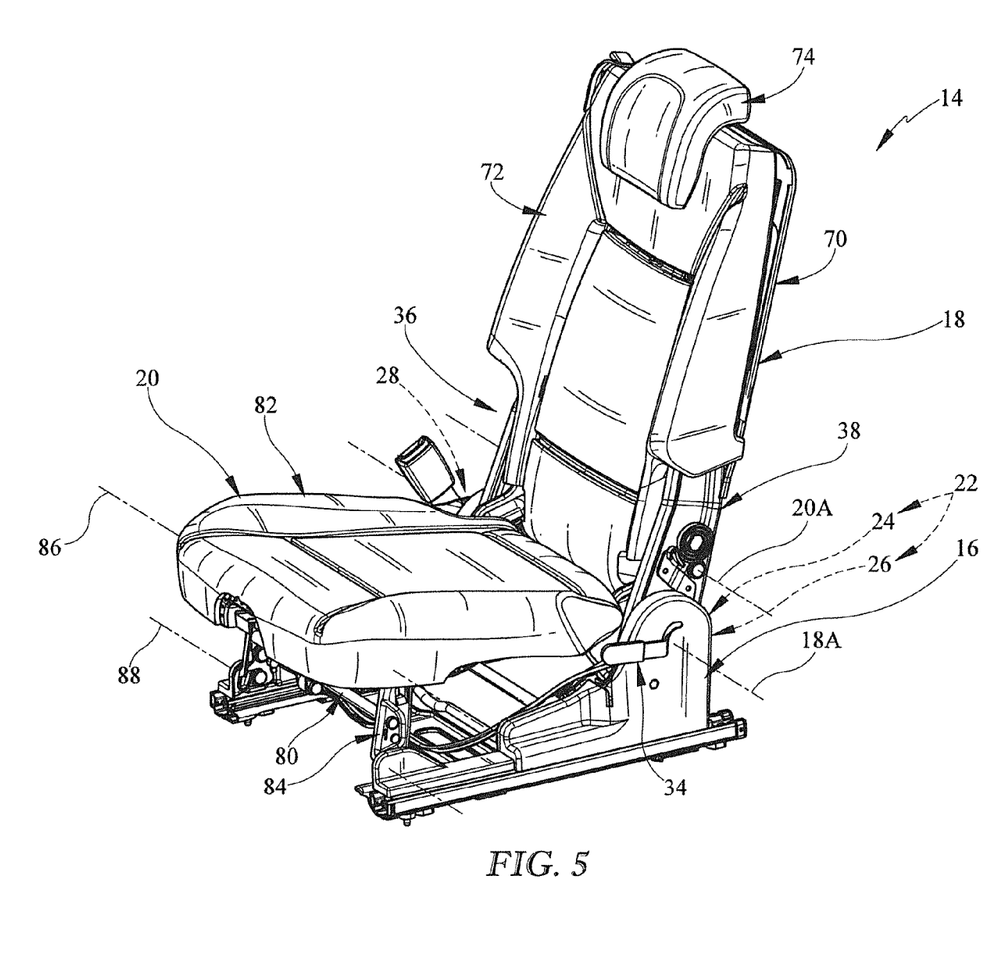
FIG. 5 is a perspective view of an embodiment of the vehicle seat capable of the movement illustrated in FIGS. 1-4.
Figure 6:
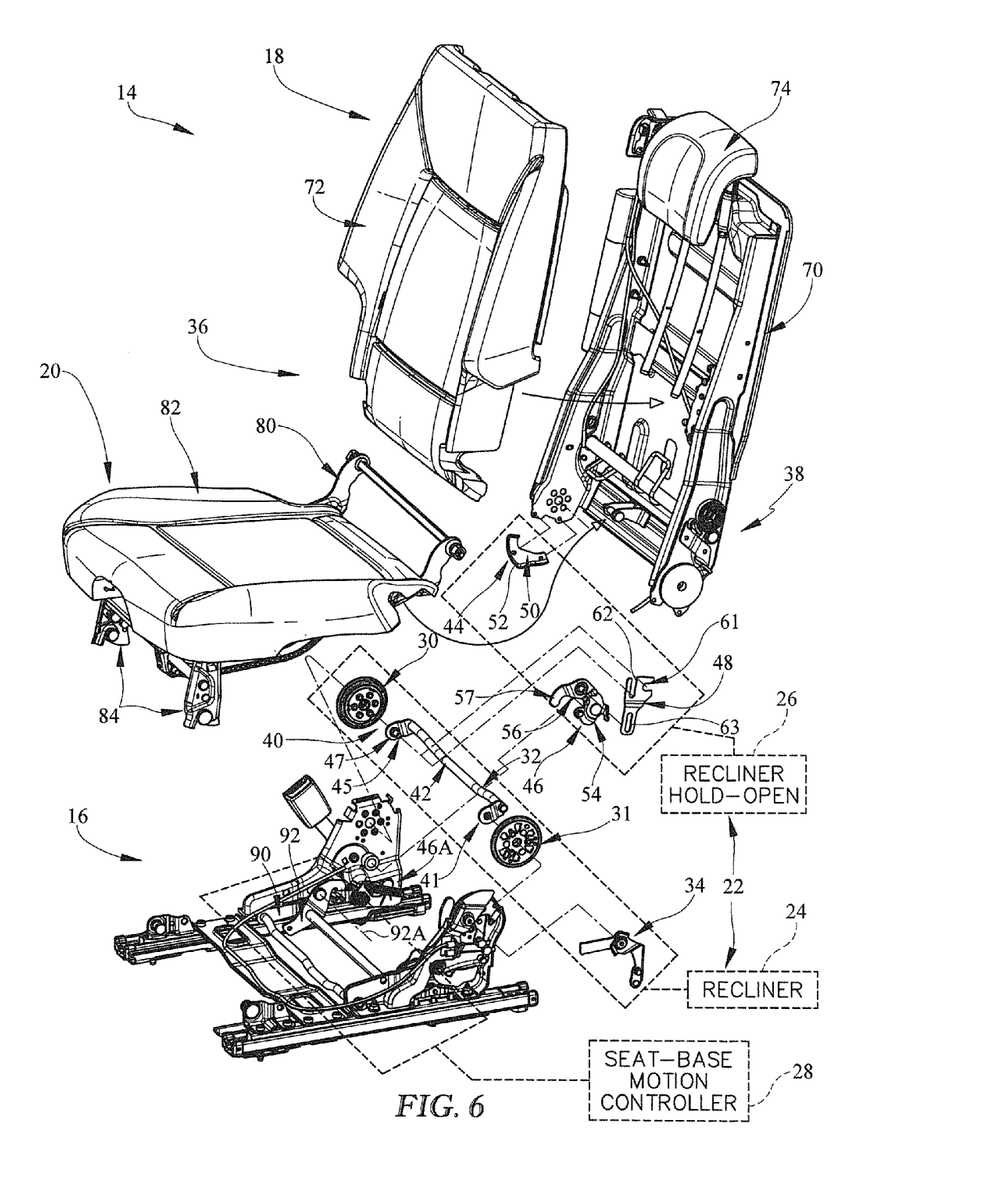
FIG. 6 is an exploded view of the vehicle seat of FIG. 5.

FIGS. 5 and 6 are perspective and exploded views, respectively, of an illustrative seat assembly 14 equipped with the above-described fold-forward motion controller 22 and capable of the above-described movements in conjunction with the seat-base motion controller 28. With reference to FIG. 5, the seat back 18 of the illustrative embodiment includes a seat frame 70, a cushion assembly 72, and a headrest 74. The seat frame 70 is coupled to the seat base 16 to pivot about the seat-back pivot axis 18A. The cushion assembly 72 is coupled to the seat frame 70 and extends along the seat frame 70. The headrest 74 is coupled to the seat frame 70 and is spaced apart from the seat-back pivot axis 18A. The illustrated seat bottom 20 includes a seat pan 80, a cushion assembly 82, and a support leg 84. The seat pan 80 is coupled to the seat back 18 for movement about a seat-bottom pivot axis 20A. The cushion assembly 82 is coupled to the seat pan 80. The support leg 84 is coupled to the seat pan 80 for movement about an upper-leg axis 86 and is coupled to the seat base 16 for movement about a lower-leg axis 88.

The illustrated seat bottom 20 moves between a raised position, shown by way of example in FIG. 1, and a lowered position, shown by way of example in FIG. 4. In the raised position, the seat pan 80 is spaced apart from the floor 11 of the vehicle 10, and the support leg 84 may extend substantially perpendicular to the seat pan 80 and the floor 11. In the lowered position, the seat pan 80 is moved toward the floor 11 from the raised position, and the support leg 84 may be pivoted to extend generally parallel to the seat pan 80 and the floor 11 as shown.

In the illustrated embodiment, when the seat back 18 is in the upright position, the seat bottom 20 is in the raised position so that a passenger-use configuration of the vehicle seat 14 is established as shown in FIG. 1. When the seat back 18 is in the folded-forward position, the seat bottom 20 is in the lowered position so that a fold-flat configuration of the vehicle seat 14 is established. In addition to opening the recliner 24, the handle 34 may be configured to release the support leg 84 for pivotal movement about the upper-leg axis 86 and the lower-leg axis 88 so that the seat bottom 20 is allowed to move between the raised position and the lowered position.

With reference now to FIG. 6, various components of an illustrative recliner 24 and recliner hold-open mechanism (or recliner hold-open) 26 of the fold-forward motion controller are illustrated. In this embodiment, the recliner 24 is coupled to the seat base 16 and to the seat back 18 and includes a pair of rotary-recliner mechanisms 30, 31, a crossbar 32, and the previously mentioned handle or actuator 34. Each rotary-recliner mechanism 30, 31 may be locked to prevent relative pivotal movement between the seat back 18 and the seat base 16, or each rotary-recliner mechanism may be unlocked to allow such relative pivotal movement. The crossbar 32 is interposed between and coupled to the rotary-recliner mechanisms 30, 31 so that the rotary-recliner mechanisms 30, 31 are locked and unlocked together. The handle 34 is coupled to the crossbar 32 and may be engaged to actuate or unlock the rotary-recliner mechanisms 30, 31, thereby opening the recliner 24 so that the seat back 18 is free to move about the seat-back pivot axis 18A. In the illustrated embodiment, the handle 32 can actuate the recliner to release the seat back 18 for movement along a range of positions between the reclined position and the upright position and/or for movement between the upright position and the folded-forward position.

One of the illustrated rotary-recliner mechanisms 30 is located along a first or inboard side 36 of the vehicle seat 14, and the other rotary-recliner mechanism 31 is located along an opposite second or outboard side 38 of the vehicle seat 14. Examples of suitable rotary-recliner mechanisms 30, 31 are described in U.S. Pat. No. 7,360,838, which is hereby incorporated by reference in its entirety. Though not shown in detail here, the rotary-recliner mechanisms 30, 31 may each include a plurality of cams, toothed pawls, and a toothed ring. More specifically, the rotary recliner mechanisms 30, 31 of the embodiment shown in the figures may each include three toothed pawls (not shown). In some embodiments, the toothed rings of the rotary-recliner mechanisms 30, 31 are formed to include locking zones and dead (or free) zones. The locking zones have teeth configured for engagement with the pawls, and the dead zones have no such teeth. In such embodiments, the rotary recliner 30 is locked when the teeth of the pawls engage the locking zones of the toothed ring and is internally unlocked when the teeth of the pawls engage the dead zones.

In embodiments with three or more toothed pawls and a ring formed to include dead zones, the range of motion across which the rotary recliner mechanism 30 is unlocked may be limited to less than 120 degrees. In other embodiments, the rotary-recliner mechanism 30, 31 is of any other suitable type configured to be locked and unlocked to respectively prevent and allow seat back 18 movement relative to the seat base. In one or more embodiments, the recliner is 24 configured so that the seat back 16 pivots through an angle of about 107 degrees when moved between the upright position and the folded-forward position. In some embodiments, the recliner is 24 configured so that the seat back 16 pivots through an angle of about 124 degrees when moved between the reclined position to the folded-forward position.

The crossbar 32 connects the rotary-recliner mechanisms 30, 31 and may include an inboard segment 40, an outboard segment 41, and a central segment 42 as shown in FIG. 6. The inboard segment 40 is coupled to one of the rotary-recliner mechanisms 30 along the inboard side 36 of vehicle seat 14. The inboard segment 40 includes a tab 45 and a pin 47 extending away from the tab 45 toward the outboard side 38 of the vehicle seat 14 along the seat-back pivot axis 18A. The outboard segment 41 is coupled to the other rotary-recliner mechanism 31 along the outboard side 38 of the vehicle seat 14. The outboard segment 41 is also coupled to the handle 34 along the seat-back pivot axis 18A. The central segment 42 extends between the inboard segment 40 and the outboard segment 41 and is spaced apart or offset from the seat-back pivot axis 18A. The crossbar 32 is movable about the seat-back pivot axis 18A between a first position, in which the rotary-recliner mechanisms 30, 31 are locked (i.e., when the recliner is in the closed configuration), and a second position, in which the rotary-recliner mechanisms 30, 31 are unlocked (i.e., when the recliner is in the open configuration). This movement between the first and second positions of the crossbar 32 in conjunction with the changing recliner configuration is described further below.

The illustrated handle 34 is coupled to the outboard segment 41 of the crossbar 32 and extends along the outboard side 38 of the vehicle seat 14. The handle 34 is configured to move the crossbar 32 from the first position to the second position when a force F is applied to the handle. Thus, when force F is applied to the handle 34, the recliner 24 is opened and the seat back 18 is freed to move from the upright position toward the folded-forward position. It is contemplated that in other embodiments other types of actuators (such as a button, a lever, a knob, or another suitable actuator) may be used to open the recliner 24.

The recliner hold-open mechanism 26 is coupled to the seat back 18 and the recliner 24. The illustrated recliner hold-open mechanism 26 includes a cam plate 44, a cam follower 46, and a hold-open link 48. The cam plate 44 is coupled to the seat back 18 for movement therewith about the seat-back pivot axis 18A. The illustrated cam plate 44 includes a flange 50 and a cam surface 52. The flange 50 of the cam plate 44 may be coupled to the seat back 18 along the inboard side 36 of the vehicle seat 14, as shown in FIG. 6. The illustrated cam surface 52 extends downwardly from the seat back 18 and engages the cam follower 46 when the seat back 18 is between the upright position and the folded-forward position, though the cam surface could be located elsewhere.

The cam follower 46 is coupled to the seat base 16, pivots relative to the seat base about an axis 46A, and is arranged to be driven by the cam plate 44. The illustrated cam follower 46 includes a body 54, a pin 56 coupled to the body 54, and a projection 57. The body 54 is coupled to the seat base 16 for pivotable movement about the pivot axis 46A. The illustrated pin 56 is spaced apart from the pivot axis 46A and extends away from the body 54 toward the outboard side 38 of the vehicle seat 14. The illustrated projection 57 extends from the body 54 toward the seat base motion controller 28. In some embodiments, the projection 57 may be omitted.

The illustrated hold-open link 48 is coupled to the cam follower 46 and to the crossbar 32 of recliner 24 to hold the recliner open while the seat back 18 is between the upright position and the folded-forward position. The hold-open link 48 may be L-shaped and formed to include a first slot 61, a second slot 62, and a third slot 63. In this example, the first slot 61 is open at one end and receives the central segment 42 of the crossbar 32. Thus, the hold-open link 48 is coupled to the central segment 42 of the crossbar 32 for sliding movement along the first slot 61. The illustrated second slot 62 is generally perpendicular to the first slot 61 and is also open at one end. The second slot 62 receives the pin 47 included in the inboard segment 40 of the crossbar 32 and thus couples the hold-open link 48 to the pin 47 of the crossbar 32 for sliding movement along the second slot 62. The illustrated third slot 63 extends generally perpendicular to the first slot 61 and generally parallel to the second slot 62. The illustrated third slot 63 is closed at both ends and receives the pin 56 of the cam follower 46 to couple the hold-open link 48 to the cam follower 46 for sliding movement along the third slot 63. The first, second, and third slots 61-63 also allow pivotal movement of the components received by each slot, and the relative positions and orientations of the slots may vary in other embodiments.

The illustrated seat-base motion controller 28 includes a track lock 90 and a forward slide blocker 92. The track lock 90 is coupled to the seat base 16 and to the foundation frame 15. The track lock 90 is configured to allow the seat base 16 to slide along the foundation frame 15 when the seat back 18 is between the upright position and the folded-forward position. The forward slide blocker 92 is coupled to the seat base 16 for movement about a blocker-pivot axis 92A and is arranged to contact the foundation frame 15 at a set point 95 (see FIGS. 7-10) when the seat base 16 and the vehicle seat 14 are slid forward along the foundation frame 15. When the seat back 18 is between the upright position and the folded-forward position, the forward slide blocker 92 allows the seat base 16 to slide forward along the foundation frame 15 past the set point 95 to a position along the foundation frame 15 that is blocked when the seat back 18 is in the upright position. This motion is shown and describe in greater detail in conjunction with subsequent figures.

The track lock 90 is configured to selectively free the seat base 16 to move along the foundation frame 15 as shown in FIG. 3. The track lock 90 moves between an engaged position, in which it prevents movement of the seat base 16 along the foundation frame 15, and a disengaged position, in which it allows movement of the seat base 16 along the foundation frame 15 as suggested by arrow 16S in FIG. 3. The forward slide blocker 92 is configured to selectively block or allow the seat base 16 to move along the foundation frame 15 past the set point 95. The forward slide blocker 92 moves about axis 92A between a lowered position, in which the forward slide blocker 92 blocks seat base 16 from moving along the foundation frame 15 beyond a set point 95, and a raised position, in which the forward slide blocker 92 allows the seat base 16 to move along the foundation frame 15 past the set point 95. When the seat back 18 is between the upright position and the folded-forward position, projection 57 of the cam follower 46 contacts the forward slide blocker 92 to move the forward slide blocker 92 to the raised position, thereby freeing the vehicle seat 14 to slide along the foundation frame 15 past the set point 95. When the forward slide blocker 92 is in the raised position, the forward slide blocker 92 moves the track lock 90 to the disengaged position, thereby freeing the vehicle seat 14 to slide along the foundation frame 15. This motion is shown and describe in greater detail in conjunction with subsequent figures.

Figures 7A, 7B, 7C:
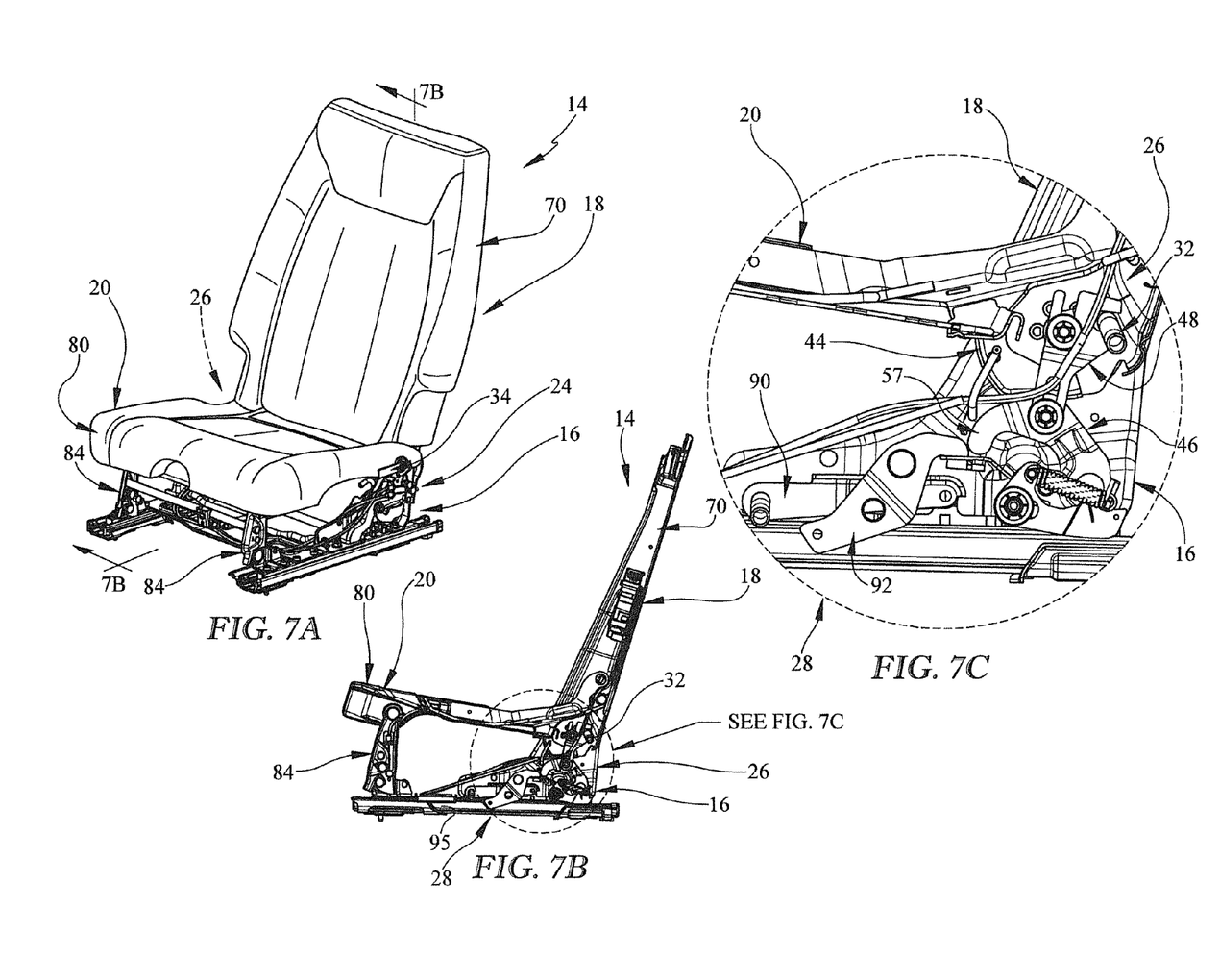
FIG. 7A is a perspective view of an embodiment of the vehicle seat capable of the movement illustrated in FIGS. 1-4 with the seat back in the upright position and the recliner in the closed position.
FIG. 7B is a cross-sectional view of the vehicle seat of FIG. 7A.
FIG. 7C is an enlarged view of a portion of FIG. 7B, showing components of a recliner hold-open mechanism with the seat back in the position of FIG. 7A.
Figures 8A, 8B, 8C:
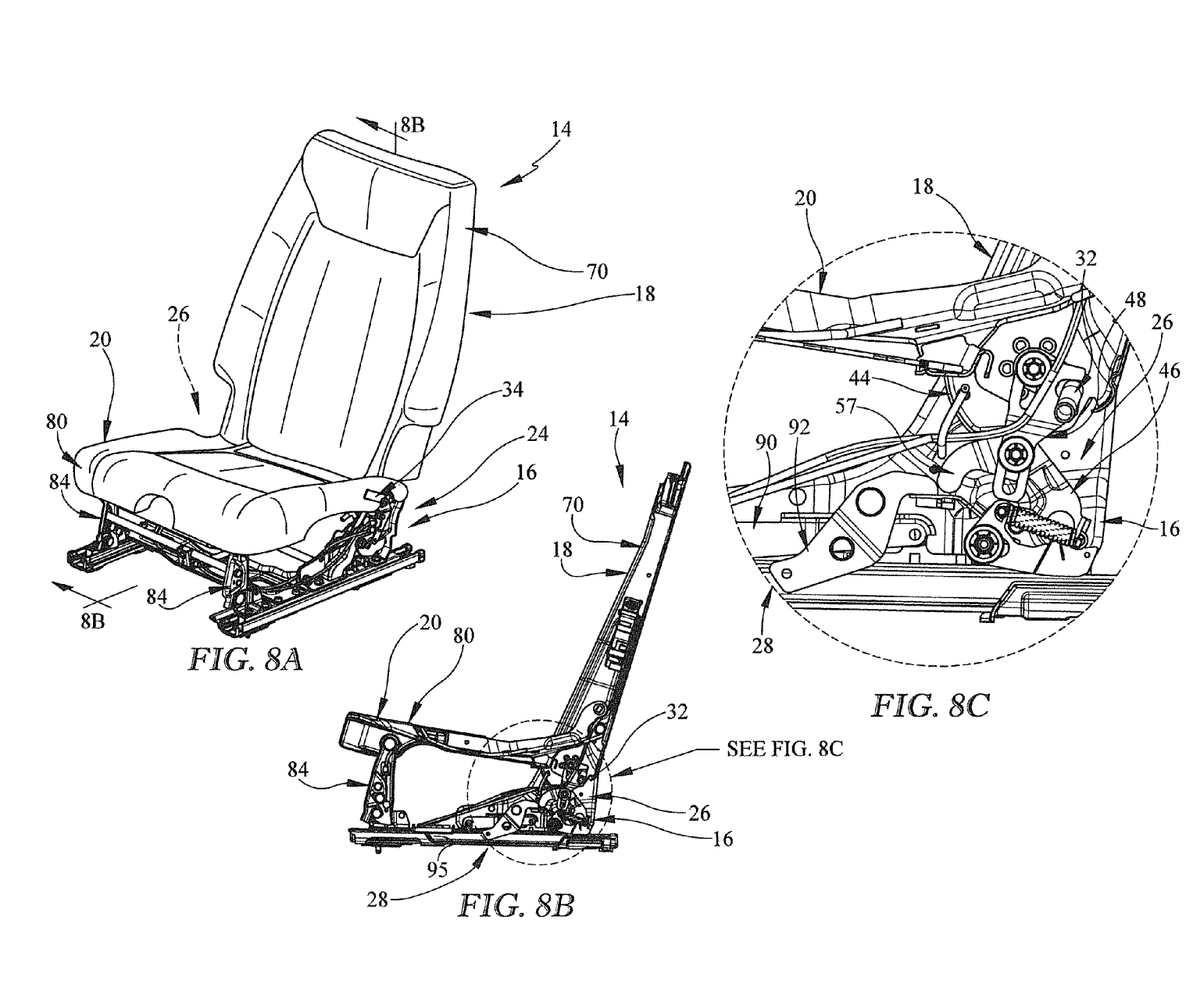
FIG. 8A is a perspective view of the vehicle seat of FIG. 7A, with the seat back in the upright position and the recliner in the open position.
FIG. 8B is a cross-sectional view of the vehicle seat of FIG. 8A.
FIG. 8C is an enlarged view of a portion of FIG. 8B, showing components of the recliner hold-open mechanism with the seat back in the position of FIG. 8A.
Figures 9A, 9B, 9C:
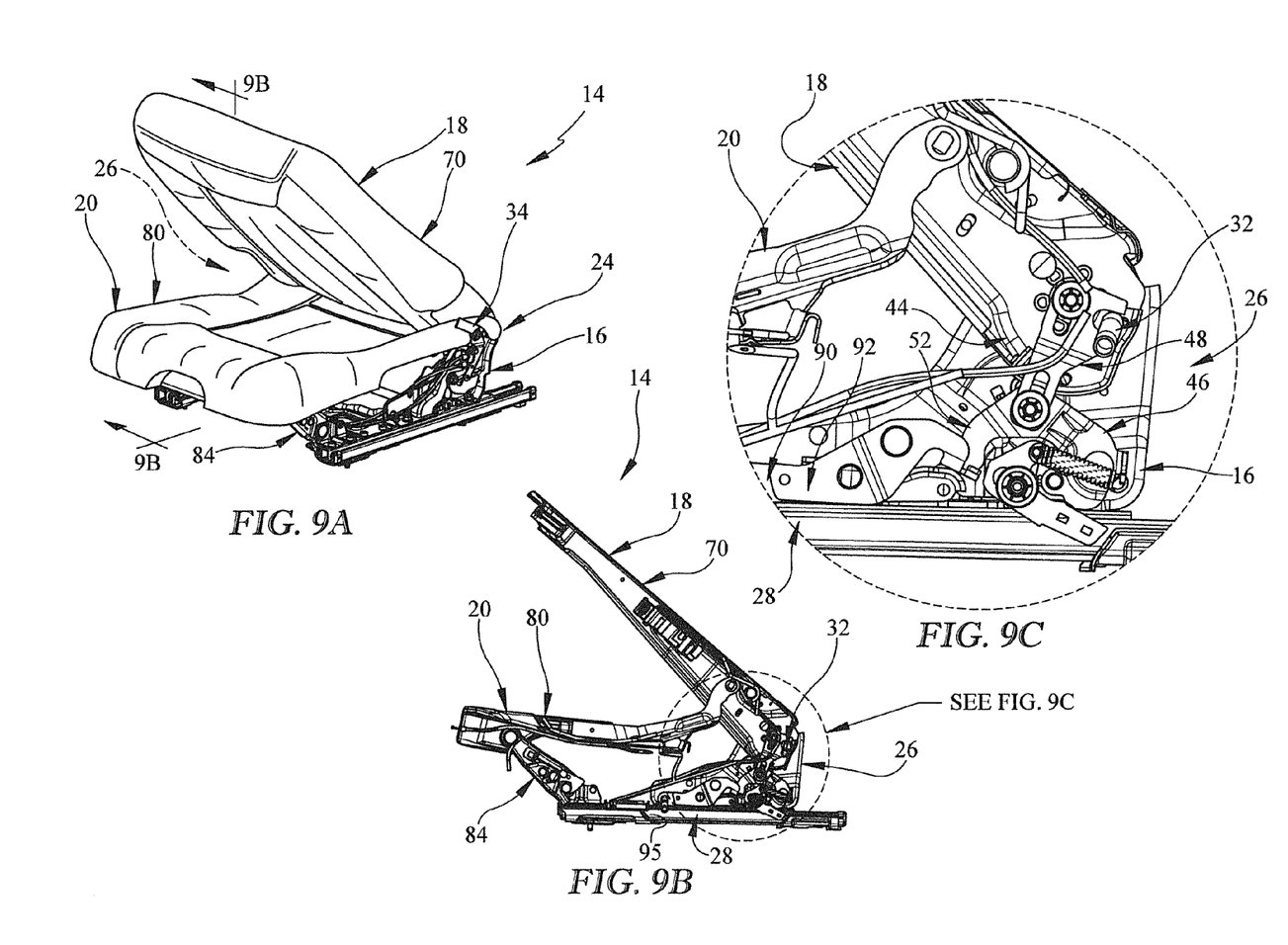
FIG. 9A is a perspective view of the vehicle seat of FIG. 7A, with the seat back between the upright position and the folded-forward position.
FIG. 9B is a cross-sectional view of the vehicle seat of FIG. 9A.
FIG. 9C is an enlarged view of a portion of FIG. 9B, showing components of the recliner hold-open mechanism with the seat back in the position of FIG. 9A.
Figures 10A, 10B, 10C:
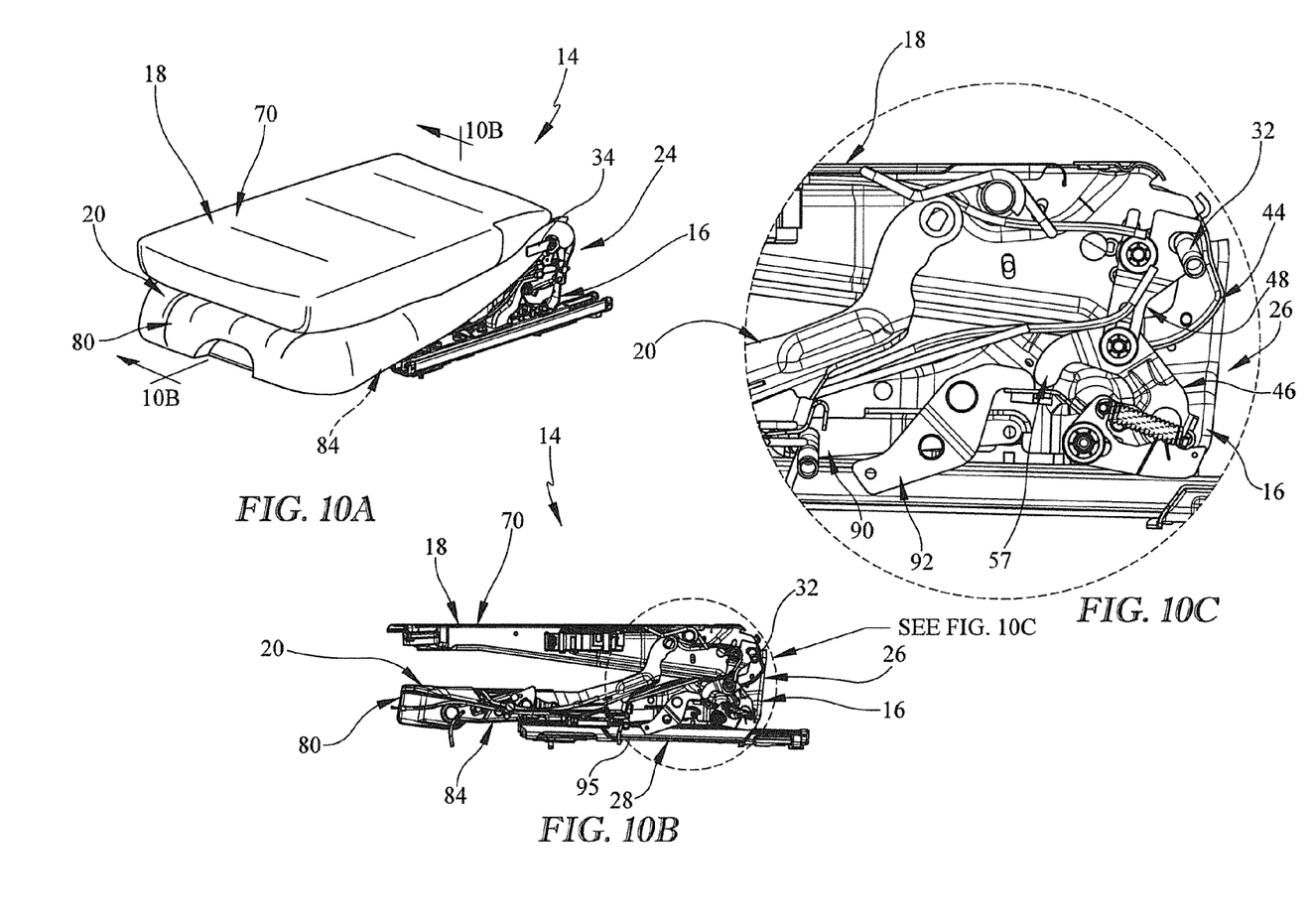
FIG. 10A is a perspective view of the vehicle seat of FIG. 7A, with the seat back in the folded-forward position.
FIG. 10B is a cross-sectional view of the vehicle seat of FIG. 10A.
FIG. 10C is an enlarged view of a portion of FIG. 10B, showing components of the recliner hold-open mechanism with the seat back in the position of FIG. 10A.

FIGS. 7-10 show the above described components of FIG. 6 in operation corresponding to the vehicle seat movements depicted in FIGS. 1-4. FIG. 7A is a perspective view of an illustrative vehicle seat 14 with the seat back 18 in the upright position as shown in FIG. 1. FIG. 7B is a cross-sectional view taken from FIG. 7A, and FIG. 7C is an enlarged view taken from FIG. 7C, showing the interconnections between the recliner 24, the recliner hold-open mechanism 26, and the seat-base motion controller 28. FIGS. 8-10 include corresponding perspective views (FIGS. 8A, 9A and 10A), cross-sectional views (FIGS. 8B, 9B and 10B), and enlarged cross-sectional views (FIGS. 8C, 9C, and 10C) of the same vehicle seat 14. FIGS. 8A-8C correspond with FIG. 2 and show the vehicle seat 14 with the seat back 18 in the upright position and with the recliner 24 changed to the open configuration from the closed configuration of FIGS. 7A-7C. FIGS. 9A-9C correspond with FIG. 3 and show the vehicle seat with the seat back 18 between the upright position and the folded-forward position. FIGS. 10A-10C correspond with FIG. 4 and show the vehicle seat 14 with the seat back 18 in the folded-forward position.

Movement of the seat back 18 from the upright position to the folded-forward position is initiated by actuating the recliner 24. The actuator in this case is the handle 34, and the actuator is engaged by moving the handle 34 of the recliner. When the user applies force to the handle 34, the handle 34 pivots from the generally horizontal position of FIG. 7A to the inclined position of FIG. 8A. The handle 34 and the crossbar 32 pivot about the seat-back pivot axis so that the crossbar 32 is moved from the first position of FIGS. 7A-7C, corresponding to the recliner 24 being closed, to the second position of FIGS. 8A-8C, corresponding to the recliner 24 being opened. As shown in FIGS. 7C and 8C, recliner 24 movement from the closed position of FIG. 7C to the open position of FIG. 8C includes rotation of the crossbar 32 with the pin 47 of the crossbar at the rotational axis. Because the central portion 42 and the pin 47 of the crossbar 32 are offset from each other, this rotation causes the central portion 42 to rotate about the pin 47, thus forcing the hold-open link 48 down, with the pin 47 of the crossbar and the pin 56 of the cam follower 46 sliding along the respective second and third slots 62, 63 of the hold-open link 48. The seat back 18 is now free to move from the upright position toward the folded-forward position, and the pin 56 of the cam follower 46 is at the top end of the third slot 63. In another embodiment, the central portion 42 and the pin 47 are reversed so that the pin 47 rotates about the central portion 42. One or both of the central portion 42 and the pin 47 are offset from the pivot axis 18A.

FIGS. 9A-9C show the vehicle seat 14 with the seat back 18 pivoted forward away from the upright position and toward the folded-forward position. This movement causes the cam surface 52 of the cam plate 44 to engage the cam follower 46, thus rotating the cam follower 46 and moving the pin 56 of the cam follower 46 downward along the third slot 63 of the hold-open link 48. The recliner 24 is now locked in the open configuration, even after the user has released the handle or even after another type of actuator is similarly disengaged, due to the pin 56 of the cam follower 46 holding the crossbar 32 in the second position (i.e. with the recliner 24 in the open configuration).

In the particularly illustrated example, the vehicle seat 14 is also configured to move from the passenger-use configuration, as shown in FIG. 1, to an easy-entry configuration, in which the seat back 18 is moved to an inclined-forward position without reaching the folded-forward position. During movement from the upright position to the inclined-forward position (similar to the position shown in FIG. 3), the seat base 16 is freed to slide along the foundation frame 15 from a slid-back position (FIG. 1) toward a slid-forward position (similar to the position shown in FIG. 3). During movement of the seat back 18 from the upright position to the inclined-forward position, the seat-base motion controller 28 frees the seat base 16 to slide along the foundation frame 15. Specifically, when the seat back 18 moves away from the upright position toward the inclined-forward position, projection 57 of the cam follower 46 contacts the forward slide blocker 92 to move the forward slide blocker to the raised position, thereby freeing the vehicle seat 14 to slide along the foundation frame 15 past a set point 95 to the slid-forward position. When the forward slide blocker 92 is in the raised position, the forward slide blocker moves the track lock 90 to the disengaged position, thereby freeing the vehicle seat 14 to slide along the foundation frame 15.

Thus, the seat-base motion controller 28 cooperates with the recliner hold-open mechanism 26 to free the vehicle seat 14 for movement along the foundation frame 15 both when the seat back 18 is moving from the upright position to the folded-forward position of the fold-flat configuration, and when the seat back 18 is moving from the upright position to the inclined-forward position of the easy-entry configuration. In one embodiment, the fold-forward motion controller and the seat-base motion controller cooperate so that the track lock 90 is moved to the disengaged position by the cam follower 46, even in the absence of the forward slide blocker. Thus, the user can actuate the recliner 24 to change the recliner to the open configuration, thus freeing the seat back 18 to pivot about the pivot axis, and seat back movement toward the folded-forward position locks the recliner 24 in the open configuration and frees the vehicle seat to slide along the foundation frame. Or the recliner hold-open mechanism 26 may lock the recliner 24 in the open configuration even after the handle or other actuator is disengaged, and the user can separately disengage the track lock to allow the seat to slide along the foundation frame.

As shown in FIGS. 10A-10C, when the seat back 18 reaches the folded-forward position, the recliner 24 is allowed to close. In the folded-forward position, the cam plate 44 releases the cam follower 46, and the hold-open link 48 disengages the crossbar 32 of the recliner 24 so that the crossbar 32 returns to the first position, corresponding to the recliner 24 being closed. Thus, when the seat back 18 reaches the folded-forward position from the upright position, the recliner 24 is closed so that the seat back 18 is prevented from moving about the seat-back pivot axis 18A. In the illustrated example, where the hold-open mechanism 26 cooperates with the seat-base motion controller as shown, the track lock 90 is moved back to the engaged position and the forward slide blocker is moved back to the lowered position when the cam follower 46 is released, thereby preventing the vehicle seat from sliding along the foundation frame 15.

Figures 11, 12:
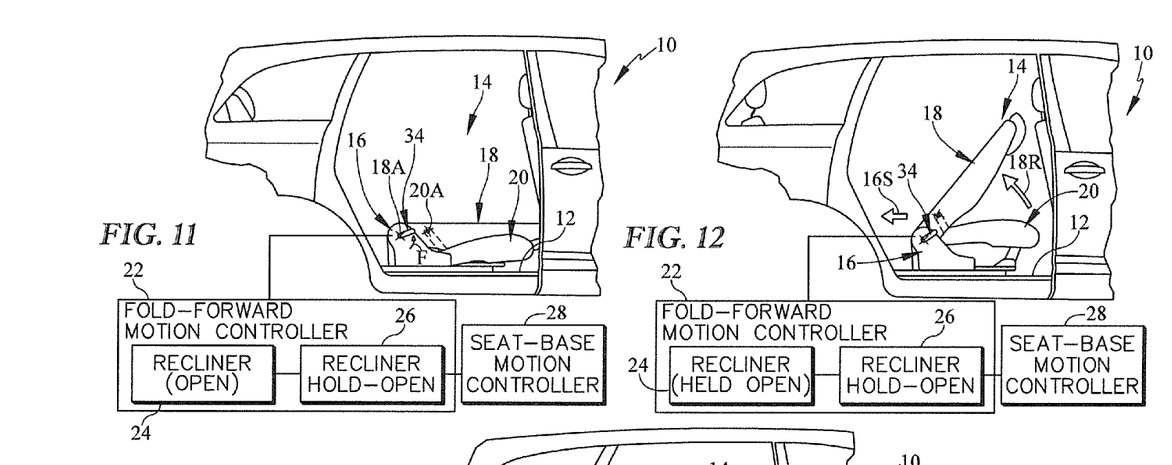
FIG. 11 is a side view of the vehicle seat of FIGS. 1-4 with the seat back in the folded-forward position and the recliner in the open position.
FIG. 12 is a side view of the vehicle seat of FIG. 11 with the seat between the upright position and the folded-forward position.
Figure 13:
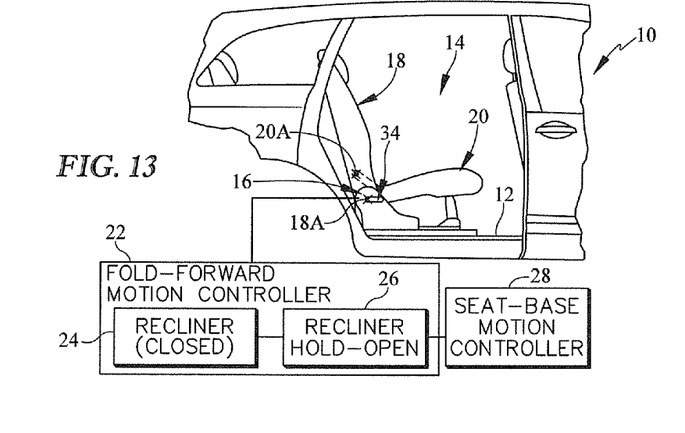
FIG. 13 is a side view of the vehicle seat of FIG. 11 with the seat in the upright position.
Figure 14A:
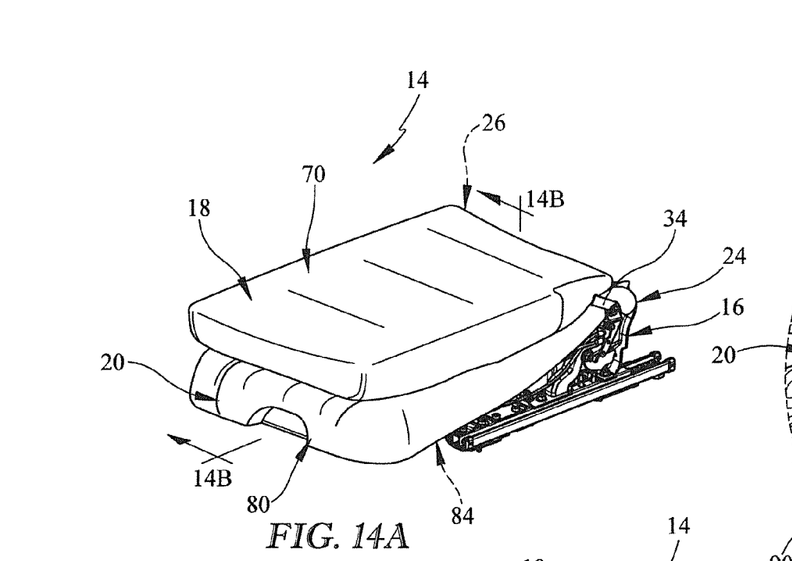
FIG. 14A is a perspective view of the vehicle seat of FIGS. 7-10, with the seat back in the folded-forward position and the recliner in the open configuration.
Figure 14B:
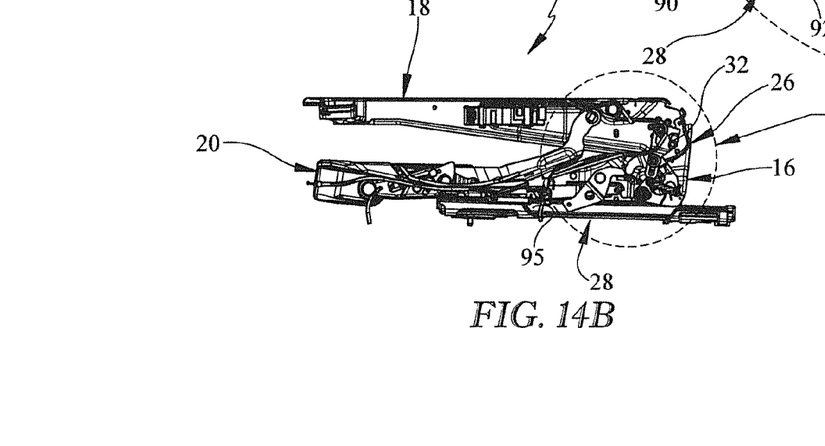
FIG. 14B is a cross-sectional view of the vehicle seat of FIG. 14A.
Figure 14C:
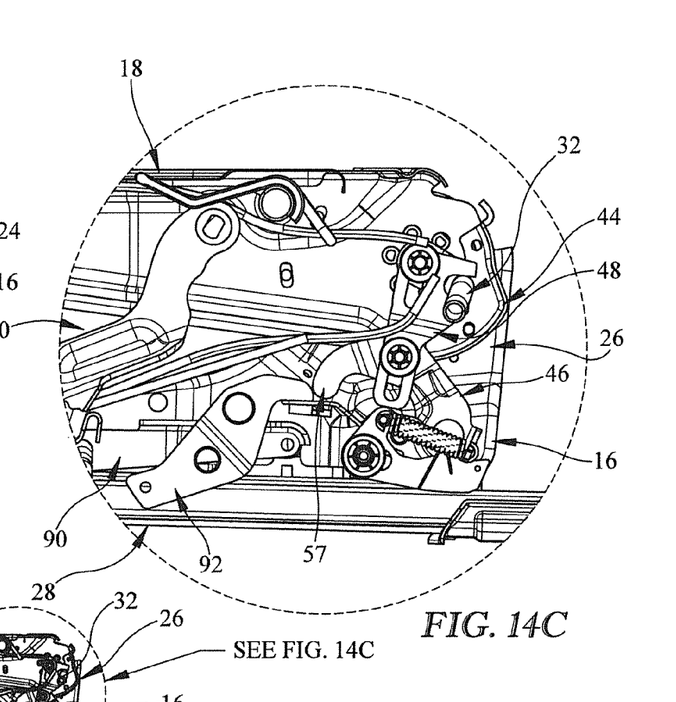
FIG. 14C is an enlarged view of a portion of FIG. 14B, showing components of the recliner hold-open mechanism with the seat back in the position of FIG. 14A.
Figures 15A, 15B, 15C:
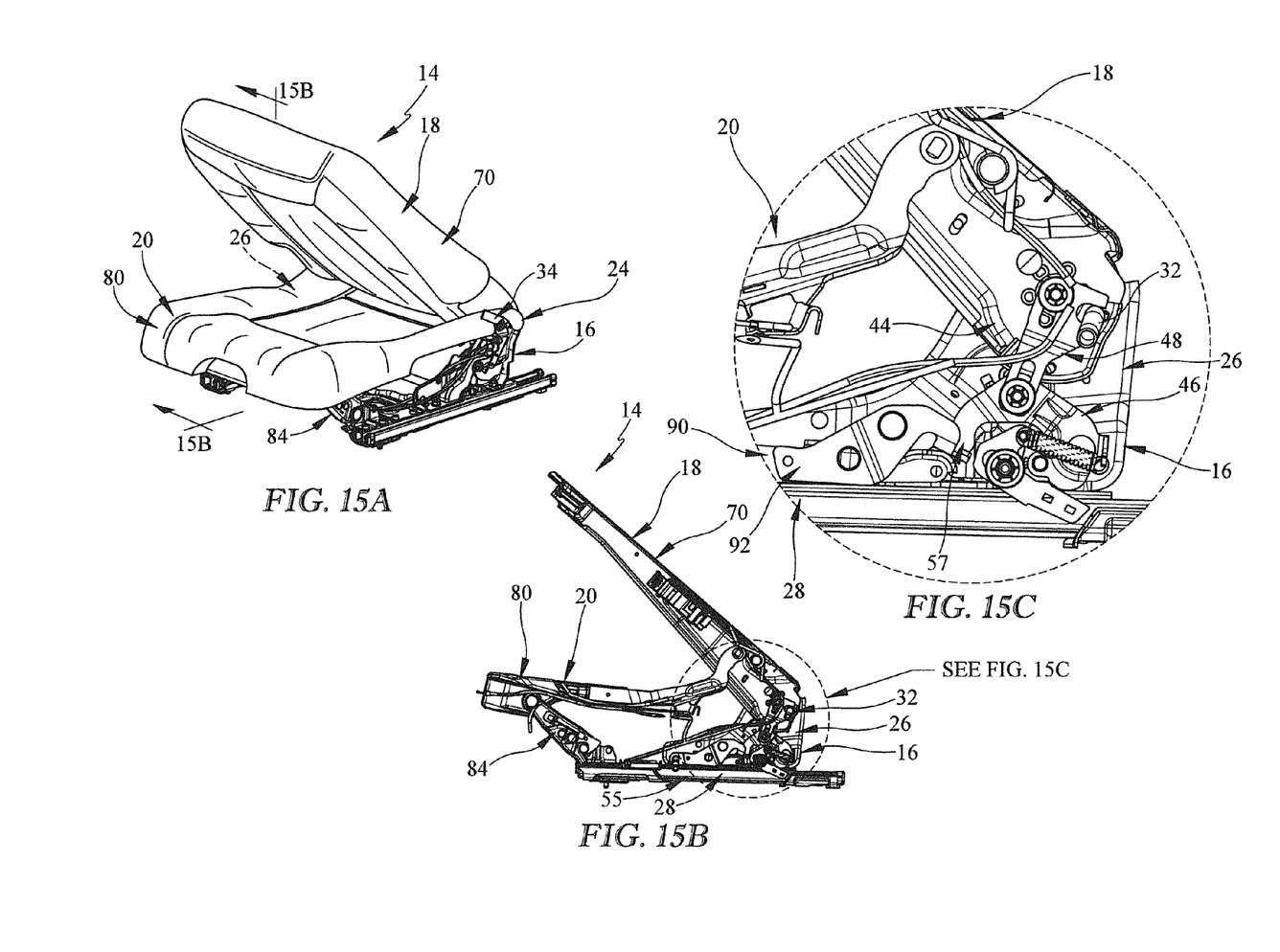
FIG. 15A is a perspective view of the vehicle seat of FIG. 14A, with the seat back between the upright position and the folded-forward position.
FIG. 15B is a cross-sectional view of the vehicle seat of FIG. 15A.
FIG. 15C is an enlarged view of a portion of FIG. 15B, showing components of the recliner hold-open mechanism with the seat back in the position of FIG. 15A.

FIGS. 11-16 illustrate vehicle seat movement from the folded-forward position of FIG. 11 to the upright position of FIG. 13. Movement of the seat back 18 from the folded-forward position to the upright position may be initiated by applying force F to the handle 34 of the recliner 24 as shown in FIG. 11. When the force F is applied to the handle 34, the handle 34 and the crossbar 32 are pivoted about the seat-back pivot axis 18A so that the crossbar 32 is moved from the first position, corresponding to the recliner 24 being closed (see FIG. 10C), to the second position, corresponding to the recliner 24 being opened, as shown in detail in FIG. 14C. When the recliner 24 is open, the seat back 18 is freed to move rearwardly about the seat-back pivot axis 18A away from the folded-forward position and toward the upright position as suggested by arrow 18R in FIG. 12.

When the seat back 18 is between the folded-forward position and the upright position, as shown in FIGS. 12 and 15A-15C, the recliner 24 is held open by the recliner hold-open mechanism 26 without force F being applied to the handle 34. More specifically, when the recliner hold-open mechanism 26 holds the recliner 24 open, the cam plate 44 pushes the cam follower 46 downward and the hold-open link 48 engages the crossbar 32 of the recliner 24 to hold the crossbar 32 in the second position, corresponding to the recliner 24 being open. While the recliner 24 is held open by the recliner hold-open mechanism 26, movement of the seat back 18 from the folded-forward position to the upright position is not interrupted even if force F is removed from the handle 34. Therefore, a user need only apply force F to the handle 34 momentarily while the seat back 18 is moved away from the folded-forward position and may then release the handle while moving the seat back 18 to the upright position.

Figures 16A, 16B, 16C:
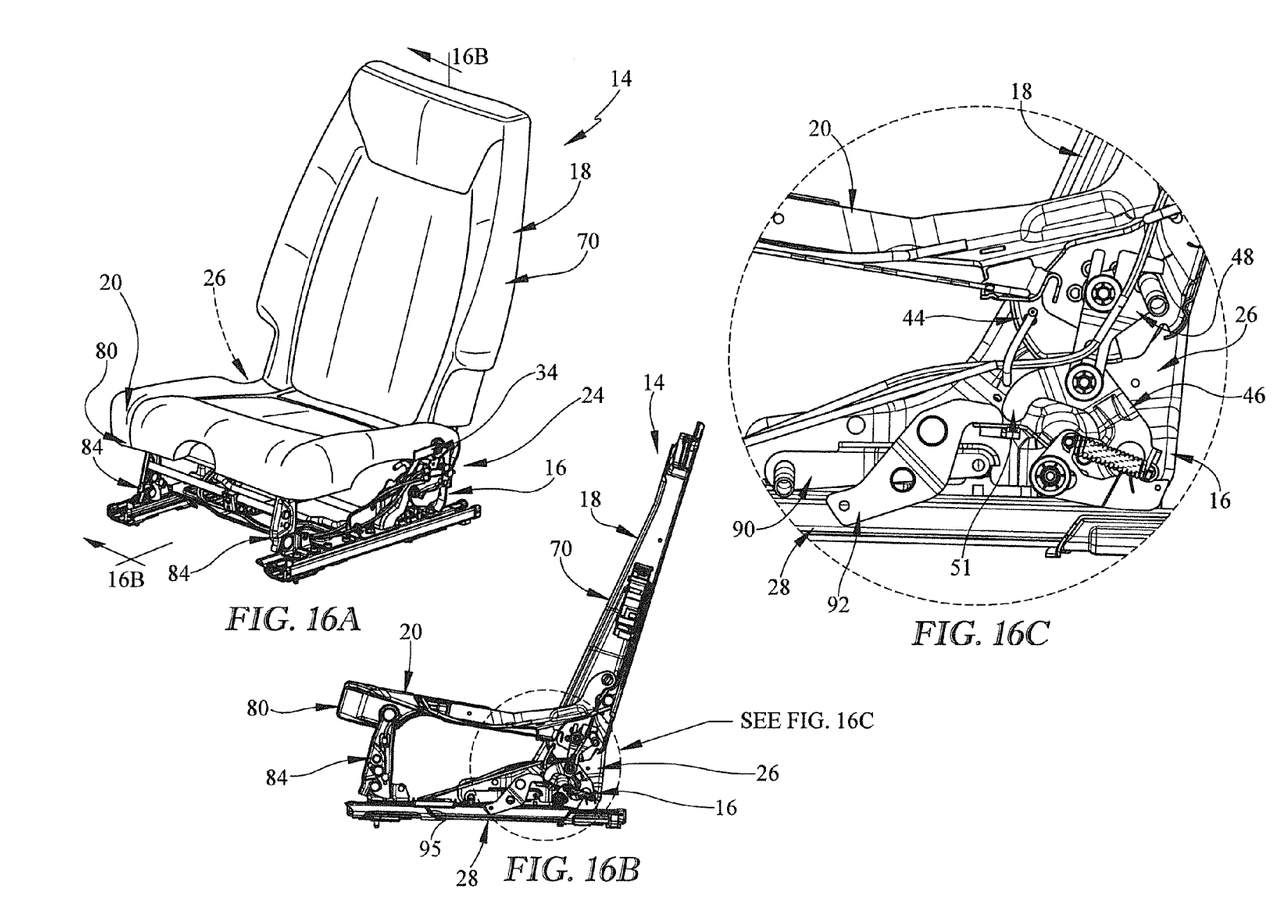
FIG. 16A is a perspective view of the vehicle seat of FIG. 14A, with the seat back in the upright position.
FIG. 16B is a cross-sectional view of the vehicle seat of FIG. 16A.
FIG. 16C is an enlarged view of a portion of FIG. 16B, showing components of the recliner hold-open mechanism with the seat back in the position of FIG. 16A.

When the seat back 18 reaches the upright position from the folded-forward position, the recliner 24 is allowed to close as shown diagrammatically in FIG. 13. In the upright position, the cam plate 44 releases the cam follower 46, as shown in FIG. 16C, and the hold-open link 48 disengages the crossbar 32 of the recliner 24 so that the crossbar 32 returns to the first position, corresponding to the recliner 24 being closed. Thus, when the seat back 18 reaches the upright position from the folded-forward position, the recliner 24 is closed so that the seat back 18 is prevented from moving about the seat-back pivot axis 18A. The track lock 90 may also be moved to the disengaged position while the seat back is moving from the folded-forward position to the upright position and while the cam follower 46 is engaged with the cam plate 44, as shown in FIGS. 12 and 15A-15C. In embodiments that include the above-described easy-entry configuration, the forward slide blocker 92 may also be moved to the raised position while the seat back is moving from the folded-forward position to the upright position and while the cam follower 46 is engaged with the cam plate 44, as shown in FIGS. 12 and 15A-15C.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle seat, comprising:
a seat base;
a seat back coupled to the seat base for movement between an upright position and a folded-forward position about a seat-back pivot axis;
a recliner having an actuator configured to change the recliner from a closed configuration to an open configuration when the actuator is engaged, wherein seat back movement about the seat-back pivot axis is prevented in the closed configuration and allowed in the open configuration; and
a recliner hold-open mechanism configured to hold the recliner in the open configuration when the actuator is disengaged during movement of the seat back between the upright position and the folded-forward position, wherein the recliner is in the closed configuration when the actuator is disengaged while the seat back is in the folded-forward position,
wherein the recliner hold-open mechanism comprises a cam plate coupled to the seat back for movement therewith about the seat-back pivot axis and a cam follower coupled to the seat base for movement about a different pivot axis that passes through the cam follower and is in a fixed position relative to the seat base during movement of the seat back between the upright position and the folded-forward position.

2. A vehicle seat as defined in claim 1, wherein the cam plate engages the cam follower to hold the recliner in the open configuration and releases the cam follower to place the recliner in the closed configuration.

3. A vehicle seat as defined in claim 1, wherein the recliner hold-open mechanism comprises a hold-open link coupled to the cam follower and to the recliner.

4. A vehicle seat as defined in claim 1, further comprising a track lock coupled to the seat base and configured to move between an engaged position and a disengaged position, wherein seat base movement along a foundation frame is prevented in the engaged position and allowed in the disengaged position.

5. A vehicle seat as defined in claim 4, the cam follower being configured to move the track lock to the disengaged position during movement of the seat back between the upright position and the folded-forward position.

6. A vehicle seat as defined in claim 4, further comprising a forward slide blocker configured to move between a lowered position and a raised position, wherein seat movement along the foundation frame beyond a set point is prevented in the lowered position and allowed in the raised position.

7. A vehicle seat as defined in claim 6, wherein the track lock and the forward slide blocker are configured to be in respective disengaged and raised positions during seat back movement between the upright position and the folded-forward position.

8. A vehicle seat as defined in claim 6, wherein the cam follower includes a protrusion that engages the forward slide blocker during seat back movement between the upright position and the folded-forward position so that the track lock and the forward slide blocker are in respective disengaged and raised positions during seat back movement between the upright position and the folded-forward position.

9. A method of moving the seat back of the vehicle seat of claim 1 between the upright position and the folded-forward position, comprising the steps of:
   (a) interacting with the vehicle seat of claim 1;
   (b) engaging the actuator while the seat back is in one of the upright position or the folded-forward position;
   (c) moving the seat back about the seat-back pivot axis to a position between the upright position and the folded-forward position;
   (d) disengaging the actuator while the seat back is the position of step (c); and
   (e) moving the seat back about the seat-back pivot axis to the other one of the upright or folded-forward positions.

10. The method of claim 9, further comprising the step of moving the vehicle seat along a foundation frame after step (b).

11. The method of claim 10, further comprising the step of changing a track lock from an engaged position to a disengaged position to allow the vehicle seat to move along the foundation frame.

12. The method of claim 11, wherein step (c) includes the step of changing the track lock.

13. The method of claim 10, further comprising the step of changing a forward slide blocker from a lowered position to a raised position to allow the vehicle seat to move past a set point during the step of moving the vehicle seat along the foundation frame.

14. A vehicle seat, comprising:
a seat base;
a seat back coupled to the seat base for movement between an upright position and a folded-forward position about a seat-back pivot axis;

a recliner having an actuator configured to change the recliner from a closed configuration to an open configuration when the actuator is engaged, wherein seat back movement about the seat-back pivot axis is prevented in the closed configuration and allowed in the open configuration;

a recliner hold-open mechanism configured to hold the recliner in the open configuration when the actuator is disengaged while the recliner is in the open configuration;

a track lock coupled to the seat base and configured to move between an engaged position and a disengaged position, wherein seat base movement along a foundation frame is prevented in the engaged position and allowed in the disengaged position, the recliner hold-open mechanism comprising a cam follower configured to move the track lock to the disengaged position during movement of the seat back between the upright position and the folded-forward position; and a forward slide blocker configured to move between a lowered position and a raised position, seat movement along the foundation frame beyond a set point being prevented in the lowered position and allowed in the raised position, wherein the cam follower includes a protrusion that engages the forward slide blocker during seat back movement between the upright position and the folded-forward position so that the track lock and the forward slide blocker are in respective disengaged and raised positions during seat back movement between the upright position and the folded-forward position.

15. A vehicle seat as defined in claim 14, wherein the recliner hold-open mechanism comprises a cam plate coupled to the seat back for movement therewith about the seat-back pivot axis, the cam follower being coupled to the seat base for movement about a different pivot axis.

16. A vehicle seat as defined in claim 14, wherein the recliner hold-open mechanism comprises a hold-open link coupled to the cam follower and to the recliner.

* * * * *